United States Patent [19]

Mahavadi

[11] Patent Number: 5,481,674

[45] Date of Patent: Jan. 2, 1996

[54] METHOD AND APPARATUS MAPPING THE PHYSICAL TOPOLOGY OF FDDI NETWORKS

[76] Inventor: Manohar R. Mahavadi, 34512 Willbridge Ter., Fremont, Calif. 94555

[21] Appl. No.: 262,150

[22] Filed: Jun. 20, 1994

[51] Int. Cl.[6] .................................................. G06F 13/00
[52] U.S. Cl. ............................ 395/200.11; 370/85.15; 370/16; 364/DIG. 1; 364/242.94; 364/282.1
[58] Field of Search ........................................ 395/200, 800, 395/600; 370/85.15, 85.12

[56] References Cited

U.S. PATENT DOCUMENTS

| | | | |
|---|---|---|---|
| 5,226,120 | 7/1993 | Brown et al. | 395/200 |
| 5,319,644 | 6/1994 | Liang | 370/85.5 |
| 5,333,270 | 7/1994 | Brief et al. | 395/200 |
| 5,396,495 | 3/1995 | Moorwood et al. | 370/85.11 |
| 5,414,704 | 5/1995 | Spinney | 370/60 |
| 5,425,017 | 6/1995 | Copley et al. | 370/13 |

*Primary Examiner*—Mehmet Geckil
*Attorney, Agent, or Firm*—Blakely, Sokoloff, Taylor & Zafman

[57] ABSTRACT

An apparatus and method for generating a topology map representing the physical connectivity between devices on an FDDI network. A network management station constructs a connectivity table by first selecting a port which feeds a medium access controller (medium access controller) and whose external connectivity is unknown. The network management station then determines the upstream neighbor medium access controller of the medium access controller fed by the selected port. The network management station then determines the port which is fed by the output of the upstream neighbor medium access controller. The network management station then enters data into the table indicating an external connection between the selected port and the port which is fed by the output of the upstream neighbor medium access controller. The port feeding the input of the upstream neighbor medium access controller is then selected, and the process is repeated to establish the external connectivity of the port feeding the input of the upstream neighbor medium access controller. If a selected port does not directly feed a medium access controller, downstream connections are traced to determine the medium access controller directly downstream from the selected port.

17 Claims, 5 Drawing Sheets

METHOD AND APPARATUS MAPPING THE PHYSICAL TOPOLOGY OF EDDI NETWORKS

BACKGROUND OF THE INVENTION

As the use and complexity of networks continues to grow, it becomes increasingly important to provide efficient, intuitive methods for monitoring and managing networks. Consequently, methods and devices have been developed for mapping the connections between the devices on a given network (i.e. the "topology" of the network). A visual representation of the network may be generated based on such topology maps. Such visual representations assist network administrators to pinpoint problems that occur on the network.

In the past, the topology of a network has been constructed based on ID/port databases maintained on each of the hubs or concentrators in the network. Such a strategy is described, for example, in U.S. Pat. No. 5,226,120 issued to Brown et al. on Jul. 6, 1993. According to this strategy, each device on a network periodically generates an identification signal. Each identification signal contains information identifying the device which originally generated the identification signal. When a concentrator receives an identification signal, a medium access controller (MAC) in the concentrator stores data indicating (1) the device from which the identification signal originated, and (2) the specific port on which the identification signal was received, in a ID/PORT database. The concentrator rebroadcasts the identification signals it receives, and its own identification signal, to all other concentrators on the network, which build their own ID/PORT databases. A network management station on the network periodically polls each concentrator to access the information contained in the various D/PORT databases, and from this information constructs a database of the topology of the network.

As the size of a network increases, the efficiency of the method by which the network management station constructs the overall topology of the network becomes increasingly important. An inefficient topology mapping process may cause significant delays between the time a network manager requests the display of a topology map and the time the topology map is actually displayed. The practical value of topology maps as network monitoring tools decreases with the length of time required to generate the maps.

In light of the foregoing, it is clearly desirable to provide a method and apparatus for quickly and efficiently mapping the physical topology of a computer network. Further, it is clearly desirable to provide an apparatus and method for generating the physical topology of a network which is compatible with current network standards and takes advantage of the information available in networks which conform to those standards.

SUMMARY OF THE INVENTION

A method for generating a physical topology map of a network is provided. According to one embodiment of the invention, a first selected port on a station in the network is selected as a currently selected port. The first selected port has an input entity and an output entity. The first selected port has an initially unknown external connectivity. The output entity of the first selected port is known to be a first selected MAC. The first selected MAC is selected as a currently selected MAC. A first upstream MAC is selected as a currently selected upstream MAC. The fast upstream MAC is an upstream neighbor MAC of the currently selected MAC. The currently selected upstream MAC has an input entity and an output entity.

A first upstream port is selected as a currently selected upstream port. The first upstream port is the output entity of the currently selected upstream MAC. Connection data is generated which indicates that the currently selected upstream port is externally connected to the currently selected port.

The currently selected upstream MAC is disposed within a station which includes one or more ports. Each port of the station has an external connectivity. It is determined whether the input entity of the currently selected port is a master port. If the input entity of the currently selected port is not a master port, then it is determined whether the external connectivity of each port of the one or more ports is known.

If the input entity of the currently selected port is not a master port and if the external connectivity of each port of the one or more ports is not known, then the currently selected upstream MAC is selected as the currently selected MAC. The input entity of the currently selected upstream MAC is selected as the currently selected port. A second upstream MAC is selected as the currently selected upstream MAC. The second upstream MAC is an upstream neighbor MAC of the currently selected MAC. The currently selected upstream MAC has an input entity and an output entity. A second upstream port is selected as the currently selected upstream port. The second upstream port is the output entity of the currently selected upstream MAC. Connection data is generated which indicates that the currently selected upstream port is externally connected to the currently selected port.

If the input entity of the currently selected port is a master port, then it is determined whether the external connectivity of the currently selected upstream port is known. If the input entity of the currently selected port is a master port and if the external connectivity of the currently selected upstream port is known, then it is determined whether the external connectivity of each port of the one or more ports is known.

If the input entity of the currently selected port is a master port, the external connectivity of the currently selected upstream port is known, and the external connectivity of each port of the one or more ports is known, then the input entity of the currently selected port is selected as the currently selected port. A first downstream MAC is selected as the currently selected MAC. The first downstream MAC is a first MAC downstream from the currently selected upstream port. A second upstream MAC is selected as the currently selected upstream MAC. The second upstream MAC is an upstream neighbor MAC of the currently selected MAC. The currently selected upstream MAC has an input entity and an output entity. A second upstream port is selected as the current upstream port. The second upstream port is the output entity of the currently selected upstream MAC. Connection data is generated which indicates that the currently selected upstream port is externally connected to the currently selected port.

If the output entity of the currently selected upstream port is a port, then the output entity of the currently selected upstream port is selected as the currently selected upstream port. A port remotely connected to the currently selected upstream port is selected as the currently selected upstream port. It is determined whether the output entity of the currently selected upstream port is a port or a MAC. If the output entity of the currently selected upstream port is a port, then (1) the output entity of the currently selected upstream port is selected as the currently selected upstream port and (2) a port remotely connected to the currently selected upstream port is selected as the currently selected upstream port, until the output entity of the currently selected upstream port is a MAC. If the output entity of the currently selected upstream port is a MAC, then the output entity of the currently selected upstream port is selected as the currently selected MAC.

According to another aspect of the present invention, a network management station for generating a physical topology map of an FDDI network system is provided. The network management station generally includes a processor and a storage device. The storage device is operatively coupled to the processor. A table, identification data, a plurality of instructions, and a plurality of pointers are stored on the storage device.

The table includes storage locations for storing connection data indicative of a plurality of physical connections between a plurality of devices on the FDDI network system. The identification data represents each device of the plurality of devices. The plurality of pointers include a currently selected port pointer for indicating a currently selected port, a currently selected upstream port pointer for indicating a currently selected upstream port, a currently selected MAC pointer for indicating a currently selected MAC, and a currently selected upstream MAC pointer for indicating a currently selected upstream MAC.

The processor executes the plurality of instructions to generate the connection data. The plurality of instructions include instructions for causing the currently selected port pointer to point to identification data representing a first selected port on a station in the network. The first selected port has an input entity and an output entity. The first selected port has an initially unknown external connectivity. The output entity of the first selected port is known to be A first selected MAC.

The plurality of instructions further include instructions for causing the currently selected MAC pointer to point to identification data representing the first selected MAC and for causing the currently selected upstream MAC pointer to point to identification data representing a first upstream MAC. The first upstream MAC is an upstream neighbor MAC of the currently selected MAC. The currently selected upstream MAC has an input entity and an output entity.

The plurality of instructions further include instructions for causing the currently selected upstream port pointer to point to identification data representing a first upstream port. The first upstream port is the output entity of the currently selected upstream MAC. The plurality of instructions include instructions for generating connection data which indicates that the currently selected upstream port is externally connected to the currently selected port.

BRIEF DESCRIPTION OF DRAWINGS

The invention may best be understood by referring to the following description and accompanying drawings which illustrate the invention. In the drawings.

DETAILED DESCRIPTION

Figure 1A:
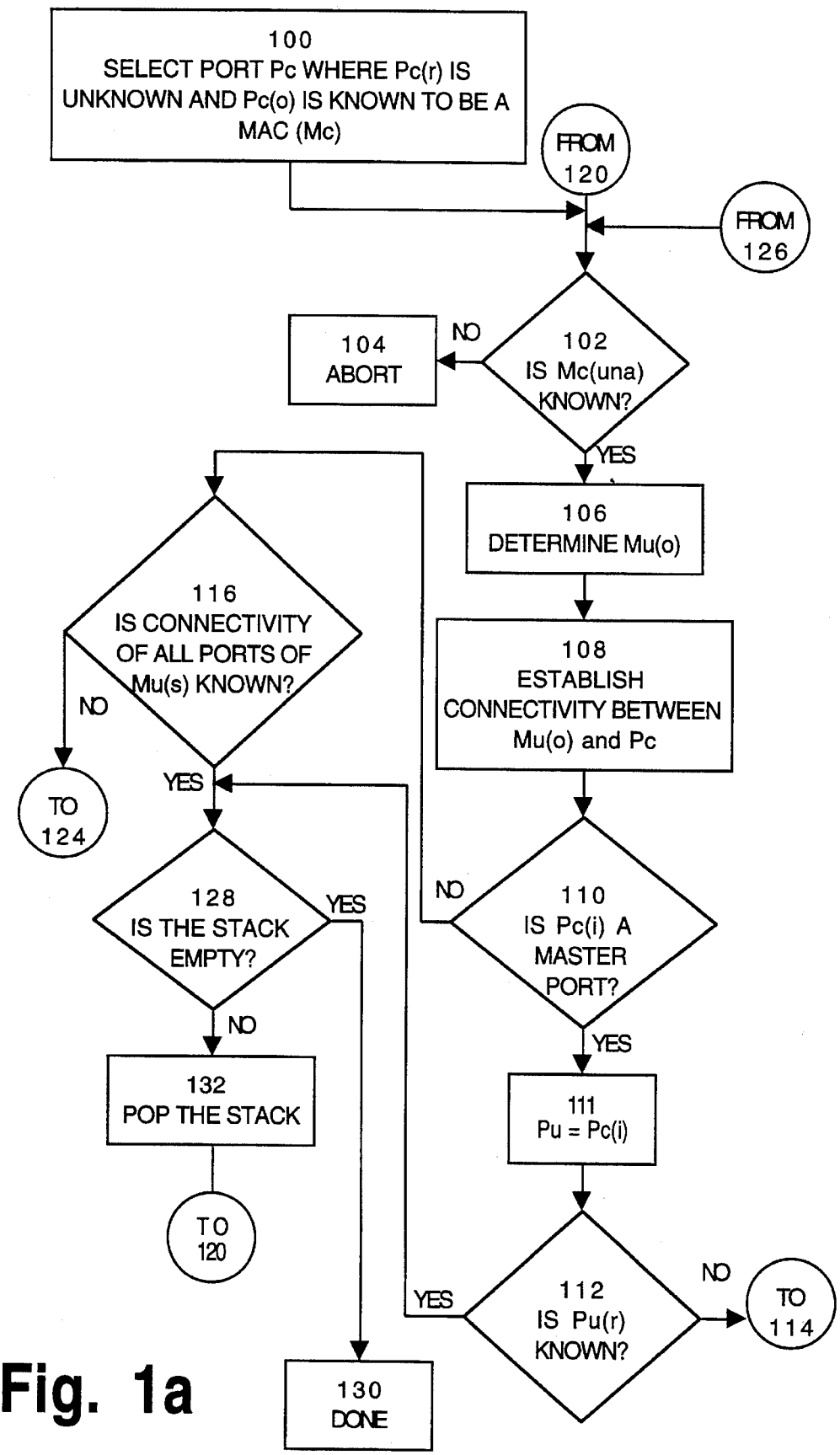
FIG. 1a is a portion of a flow chart showing a method for construction a topology map according to one embodiment of the invention.

In an FDDI network, a token is passed from MAC to MAC in a predetermined direction along a predetermined path or ring which includes all of the MACs connected to the network. MACs that receive the token prior to a given MAC are considered "upstream" from that given MAC, and MACs which receive the token after the given MAC are considered "downstream" from the given MAC.

MACs communicate through ports. Each port has an internal input, an internal output, an external input and an external output. For any given port, tokens flow from the internal input to the external output, from the external output to a remotely connected port, from the remotely connected port to the external input, and from the external input to the internal output. Ports may be either master ports or nonmaster ports, as these terms are defined in ANSI standard X3T9.5/84-49.

The ANSI standard for FDDI Station Management Revision 7.2 defines status information flames (SIFs) for collecting the operation parameters status and configuration status of a station on an FDDI network. The SIF configuration response frame includes two objects: a "path descriptor" and a "MAC neighbors". These two objects provide information about the upstream and downstream logical neighbors of a given MAC and the connectivity between the MACs and ports in a given FDDI station.

In the preferred embodiment, the configuration data of all FDDI stations on a network are used to construct a physical topology map of the network. The SIF configuration request and response frames, as defined in the ANSI standard, are used to collect the configuration data. Each FDDI station's configuration data may be acquired, for example, by periodically polling each FDDI station using SIF configuration request frames. Alternatively, the configuration data may be acquired by broadcasting SIF configuration request frames to all stations on the FDDI ring at appropriate times. Status report frames (SRFs) received from the various FDDI stations on the network may be inspected to identify any changes in the physical connectivity of a station. The nature of detected changes to the physical connectivity between two stations may be determined, for example, by sending SIF configuration request frames to the two stations involved in the reconfiguration.

While one method for acquiring configuration data has been described above, various alternative data acquisition methods are possible. Therefore, it is understood that the present invention is not limited to any specific data acquisition strategy.

The configuration data of the various FDDI stations connected in a network does not contain a physical topology map of the network, but does contain the information required to construct a complete physical topology map. The preferred method and apparatus for constructing physical topology maps from the configuration data will now be described in detail with reference to FIGS. 1–3. However, prior to a description of the various steps of the process of constructing the physical topology map, various terms used in the description shall now be defined.

The following notation is used to describe the preferred embodiment of the method and apparatus of the present invention:

Mc: the MAC currenfiy under consideration;

Pc: the port currently under consideration;

Mu: the upstream MAC currently under consideration;

Pu: the upstream port currently under consideration;

Mx(i): the entity connected to the input of MAC x;

Mx(o): the entity connected to the output of MAC x;

Px(o): the entity connected to the internal output of Port x;

Px(i): the entity connected to the internal input of Port x;

Px(s): the station to which port Px belongs;

Px(r): the port to which port Px is externally connected;

Mx(s): the station to which MACx belongs; and

Mx(una): the upstream neighbor MAC of MACx.

Figure 1B:
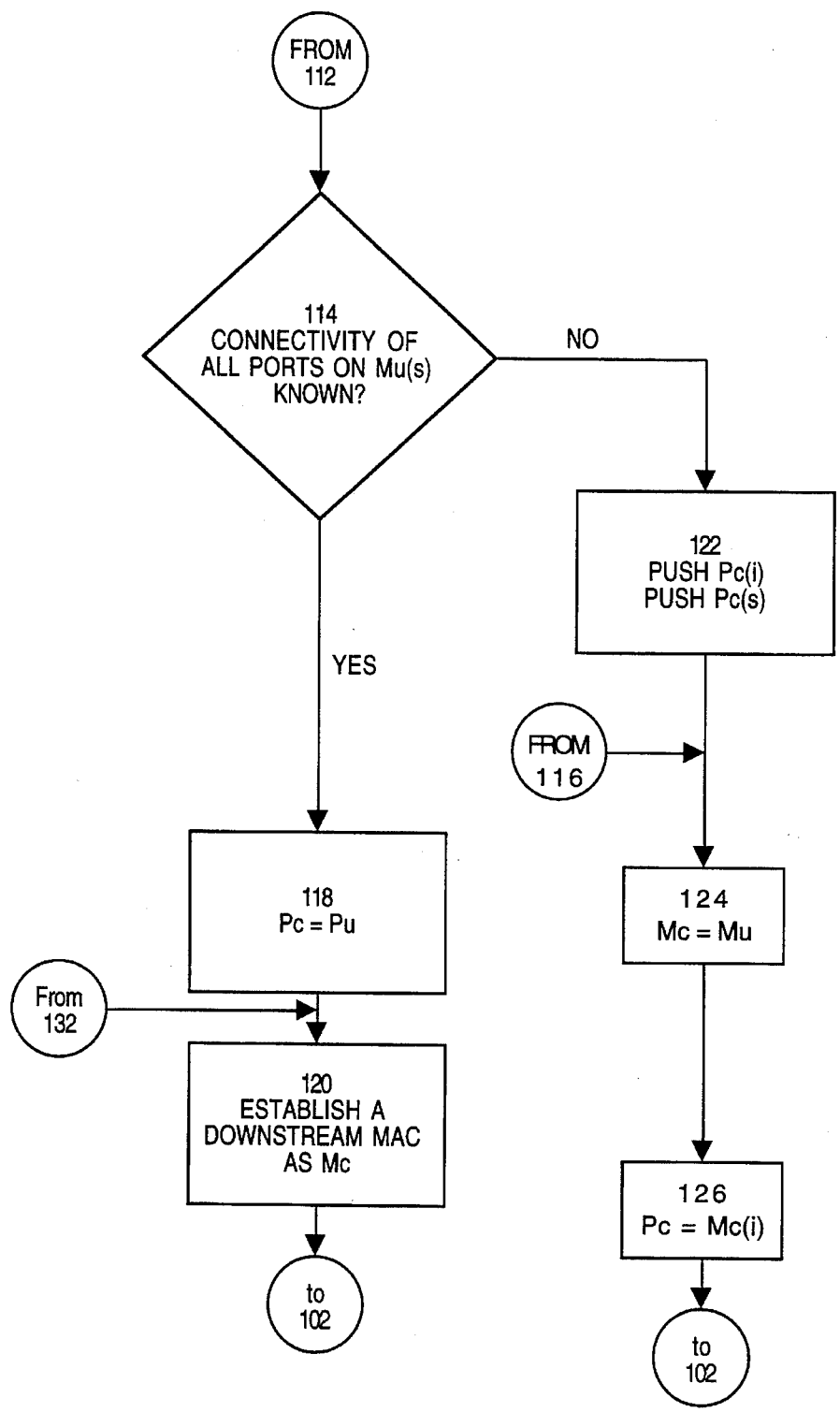
FIG. 1b is a portion of a flow chart showing a method for construction a topology map according to one embodiment of the invention.
Figure 2:
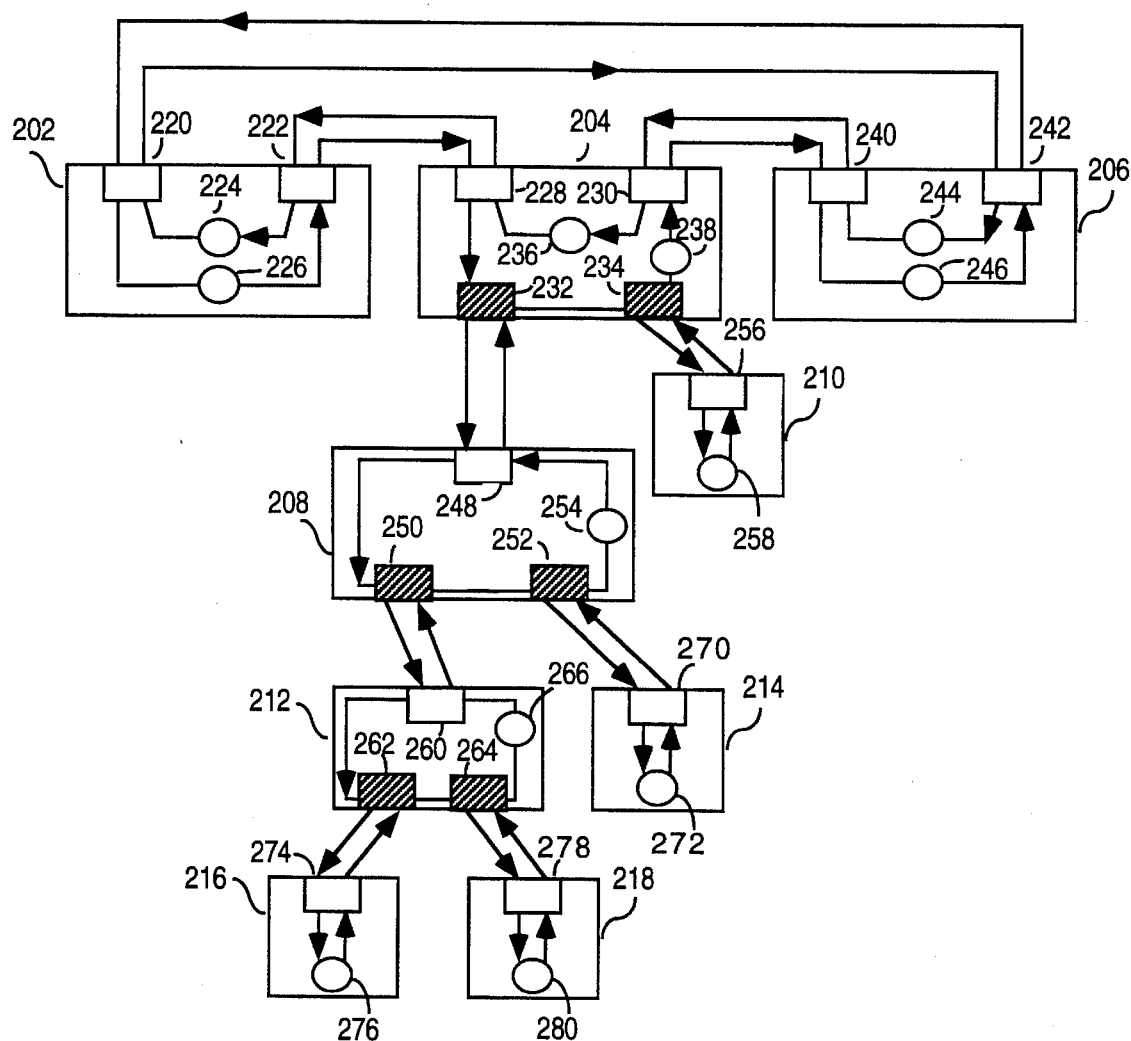
FIG. 2 is a block diagram illustrating the topology of an exemplary FDDI network system.

Referring now to FIGS. 1a, 1 b and 2, FIGS. 1a and 1b illustrate a flow chart of a method for constructing a physical topology map of an FDDI network. FIG. 2 shows an exemplary FDDI network 200 which shall be used to explain the method shown in FIGS. 1a and 1b. Network 200 includes a plurality of stations 202, 204, 206, 208, 210, 212, 214, 216, and 218. Network 200 includes a variety of station-types. For example, stations 202 and 206 are dual attachment stations, stations 210, 214, 216 and 218 are single attachment stations, stations 208 and 212 are single attachment concentrators, and station 204 is a dual attachment concentrator.

Station 202 includes a plurality of nonmaster ports 220 and 222, and a plurality of MACs 224 and 226. Station 204 includes a plurality of nonmaster ports 228 and 230, a plurality of master ports 232 and 234 and a plurality of MACs 236 and 238. Station 206 includes a plurality of nonmaster ports 240 and 242 and a plurality of MACs 244 and 246. Station 208 has a nonmaster port 248, a plurality of master ports 250 and 252, and a MAC 254. Station 210 includes a nonmaster port 256 and a MAC 258. Station 212 includes a nonmaster port 260, a plurality of master ports 262 and 264 and a MAC 266. Station 214 includes a nonmaster port 270 and a MAC 272. Station 216 includes a nonmaster port 274 and a MAC 276. Station 218 includes a nonmaster port 278 and a MAC 280. Any one of the stations on network 200 may be designated as a network management station. The network management station is the station which retrieves the configuration data from various stations on network 200 and constructs a physical topology data base therefrom.

According to one embodiment of the invention, the network management station constructs a physical topology database of network 200 from configuration data by executing instructions which implement the steps shown in FIGS. 1a and 1b. While the method shall be described with reference to an embodiment in which an individual station implements the method, the method may alternatively be implemented by, for example, distributing instructions to numerous devices across the network and causing the devices to execute and coordinate various portions of the physical mapping process.

The initial topology database contains only the information supplied to the network management station in SIF configuration response frames received from the stations on the network 200. This information includes the identity of the physical port from which each MAC on the system receives input, and the physical port to which each MAC sends output. The information also includes the identity of the MAC immediately upstream from a given MAC, and the identity of the MAC immediately downstream from a given MAC. However, the SIF configuration response frames do not contain information regarding the physical connections between the various stations.

The method for completing the physical topology database shall now be described with reference to the steps shown in FIGS. 1a and 1b. At step 100, the network management station selects a port (Pc) whose external connectivity (Pc(r)) is not known, and whose output entity (Pc(o)) is known to be a given MAC (Mc). For example, if the database does not contain an entry indicating the external connectivity of port 234, but does contain an indication that the output entity of port 234 is MAC 238, then port 234 may be selected at step 100. Control then passes to step 102.

At step 102, the network management station determines if Mc(una), the upstream neighbor MAC of Mc, is known. The upstream neighbor MAC of Mc is referred to as Mu. In the present example, the upstream neighbor MAC of MAC 238 is MAC 258. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 258, therefore Mu(o) is port 256. Once port 256 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 234 is externally connected to port 256. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 232 is the port feeding the internal input of port 234. Therefore, Pc(i) equals port 232. Since port 232 is a master port, control passes to step 111.

At step 111, Pc(i) is established as the current upstream port Pu. In the present example, port 232 is Pc(i). Therefore, at step 111, port 232 is established as Pu. Control then passes to step 112.

At step 112, the network management station determines if Pu(r), the external connectivity of Pu, is known. If Pu(r) is known, control passes to step 128, otherwise control passes to step 114. In the present example, Pu is port 232, and port 232 is externally connected to port 248. However, the external connectivity between port 232 and port 248 has not yet been established. Therefore, control passes to step 114.

At step 114, the network management station determines if the connectivity of all ports of Mu(s), the station to which Mu belongs, is known. If the connectivity of all ports of Mu(s) are known, control passes to step 118, otherwise control passes to step 122. In the present example, Mu is MAC 258, so Mu(s) is station 210. Therefore, at step 114, the network arrangement station determines if the connectivity of port 256 is known. The external connectivity between port 256 and port 234 has been established, so control passes to step 118.

At step 118, the network management station establishes Pu as the selected port, Pc. In the present example, Pu is port 232. Therefore, port 232 is established as Pc. Control then passes to step 120.

At step 120, the network management station establishes a downstream MAC as Mc. The downstream MAC established as Mc is the MAC directly downstream from Pc. In the present example, port 232 is Pc and the MAC directly downstream from port 232 is MAC 258. Therefore, at step 120 MAC 258 is established as Mc. The process by which the network management station establishes a downstream MAC is described below with reference to FIG. 3. Once port 232 is established as Pc and MAC 258 is established as Mc, control passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 258 is MAC 254. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 254, therefore Mu(o) is port 248. Once port 248 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 232 is externally connected to port 248. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 228 is the port feeding the internal input of port 232. Therefore, Pc(i) equals port 228. Since port 228 is not a master port, control passes to step 116.

At step 116, the network management station determines if the connectivity of all ports of Mu(s), the FDDI station to which Mu belongs, is known. If the connectivity of all ports of Mu(s) is known, then control passes to step 128, otherwise, control passes to step 124. In the present example, the Mu is MAC 254 and MAC 254 belongs to station 208. Therefore, station 208 is Mu(s). Station 208 includes ports 248, 250 and 252. The external connectivity of ports 250 and 252 have not yet been established. Therefore, control passes to step 124.

At step 124, the network management station establishes Mu as the selected MAC, Mc. In the present example, Mu is MAC 254. Therefore, Mc shall now refer to MAC 254. Control then passes to step 126.

At step 126, the network management station establishes Mc(i), the port which feeds Mc, as the selected port, Pc. In the present example, the port which feeds MAC 254 is port 252. Therefore, Pc shall now refer to port 252. Control then passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 254 is MAC 272. If the upstream neighbor MAC of Mc is not known, then the appropriate SIF information has not yet moved. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 272, therefore Mu(o) is port 270. Once port 270 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 252 is externally connected to port 270. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 250 is the port feeding the internal input of port 252. Therefore, Pc(i) equals port 250. Since port 250 is a master port, control passes to step 111.

At step 111, Pc(i) is established as the current upstream port Pu. In the present example, port 250 is Pc(i). Therefore, at step 111, port 250 is established as Pu. Control then passes to step 112.

At step 112, the network management station determines if Pu(r), the external connectivity of Pu, is known. If Pu(r) is known, control passes to step 128, otherwise control passes to step 114. In the present example, Pu is port 250, and port 250 is externally connected to port 260. However, the external connectivity between port 250 and port 260 has not yet been established. Therefore, control passes to step 114.

At step 114, the network management station determines if the connectivity of all ports of Mu(s), the station to which Mu belongs, is known. If the connectivity of all ports of Mu(s) are known, control passes to step 118, otherwise control passes to step 122. In the present example, Mu is MAC 272, so Mu(s) is station 214. Therefore, at step 114, the network management station determines if the connectivity of port 270 is known. The external connectivity between port 270 and port 252 has been established, so control passes to step 118.

At step 118, the network management station establishes Pu as the selected port, Pc. In the present example, Pu is port 250. Therefore, port 250 is established as Pc. Control then passes to step 120.

At step 120, the network management station establishes a downstream MAC as Mc. The downstream MAC established as Mc is the MAC directly downstream from Pc. In the present example, port 250 is Pc and the MAC directly downstream from port 250 is MAC 272. Therefore, at step 120 MAC 272 is established as Mc. Once port 250 is established as Pc and MAC 272 is established as Mc, control passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 272 is MAC 266. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 266, therefore Mu(o) is port 260. Once port 260 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 250 is externally connected to port 260. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 248 is the port feeding the internal input of port 250. Therefore, Pc(i) equals port 248. Since port 248 is not a master port, control passes to step 116.

At step 116, the network management station determines if the connectivity of all ports of Mu(s), the FDDI station to which Mu belongs, is known. If the connectivity of all ports of Mu(s) is known, then control passes to step 128, otherwise, control passes to step 124. In the present example, the Mu is MAC 266 and MAC 266 belongs to station 212. Therefore, station 212 is Mu(s). Station 212 includes ports 260, 262 and 264. The external connectivity of ports 262 and 264 have not yet been established. Therefore, control passes to step 124.

At step 124, the network management station establishes Mu as the selected MAC, Mc. In the present example, Mu is MAC 266. Therefore, Mc shall now refer to MAC 266. Control then passes to step 126.

At step 126, the network management station establishes Mc(i), the port which feeds Mc, as the selected port, Pc. In the present example, the port which feeds MAC 266 is port 264. Therefore, Pc shall now refer to port 264. Control then passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 266 is MAC 280. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 280, therefore Mu(o) is port 278. Once port 278 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 264 is externally connected to port 278. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 262 is the port feeding the internal input of port 264. Therefore, Pc(i) equals port 262. Since port 262 is a master port, control passes to step 111.

At step 111, Pc(i) is established as the current upstream port Pu. In the present example, port 262 is Pc(i). Therefore, at step 111, port 262 is established as Pu. Control then passes to step 112.

At step 112, the network management station determines if Pu(r), the external connectivity of Pu, is known. If Pu(r) is known, control passes to step 128, otherwise control passes to step 114. In the present example, Pu is port 262, and port 262 is externally connected to port 274. However, the external connectivity between port 262 and port 274 has not yet been established. Therefore, control passes to step 114.

At step 114, the network management station determines if the connectivity of all ports of Mu(s), the station to which Mu belongs, is known. If the connectivity of all ports of Mu(s) are known, control passes to step 118, otherwise control passes to step 122. In the present example, Mu is MAC 280, so Mu(s) is station 218. Therefore, at step 114, the network management station determines if the connectivity of port 278 is known. The external connectivity between port 278 and port 264 has been established, so control passes to step 118.

At step 118, the network management station establishes Pu as the selected port, Pc. In the present example, Pu is port 262. Therefore, port 262 is established as Pc. Control then passes to step 120.

At step 120, the network management station establishes a downstream MAC as Mc. The downstream MAC established as Mc is the MAC directly downstream from Pc. In the present example, port 262 is Pc and the MAC directly downstream from port 262 is MAC 280. Therefore, at step 120 MAC 280 is established as Mc. The process by which the network management station establishes a downstream MAC is described below with reference to FIG. 3. Once port 262 is established as Pc and MAC 280 is established as Mc, control passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 280 is MAC 276. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 276, therefore Mu(o) is port 274. Once port 274 is determined to be the port whose internal input is coupled to the output of Mu, control passes to step 108.

At step 108, the network management station establishes Mu(o) as Pc(r), the port externally connected to Pc. This step involves inserting an entry into the physical topology database to indicate a connection between Mu(o) and Pc. In the present example, the network management station will add an entry into the database to indicate that the port 262 is externally connected to port 274. Once the entry has been added to the database, control passes to step 110.

At step 110, the network management station determines if Pc(i), the port feeding the internal input of the selected port, is a master port. If Pc(i) is not a master port, control passes to step 116. If Pc(i) is a master port, then control passes to step 111. In the present example, port 260 is the port feeding the internal input of port 262. Therefore, Pc(i) equals port 260. Since port 260 is not a master port, control passes to step 116.

At step 116, the network management station determines if the connectivity of all ports of Mu(s), the FDDI station to which Mu belongs, is known. If the connectivity of all ports of Mu(s) is known, then control passes to step 128, otherwise, control passes to step 122. In the present example, the Mu is MAC 276 and MAC 276 belongs to station 216. Therefore, station 216 is Mu(s). Station 216 includes port 274. The external connectivity of port 274 has been established. Therefore, control passes to step 128.

Step 128, along with steps 122 and 132, makes use of a stack. As is commonly known in the art, a stack is a LIFO data storage mechanism. Data indicative of Pc(i) and Pc(s) are pushed onto the stack at step 122 when the following conditions occur: Pc(i) is a master port, Pu(r) is not known, and the connectivity of at least one port of Mu(s) is not known.

At step 128, the network management station determines if the stack is empty. If the stack is empty, control passes to step 130, otherwise, control passes to step 132. In the present example, the conditions to arrive at step 122 never occurred, therefore the stack will be empty. Consequently, control passes to step 130.

At step 130, the present phase of the map construction process is completed. However, since all of the connections on the network have not yet been established, control returns to step 100 where a port with an unknown external connectivity is selected as Pc.

If, at step 128, the stack is not empty, the network management station pops the most recently pushed data off the stack at step 132. As explained above, the data on the stack represents a port on the network and the station to which the port belongs. The network management station establishes the port represented by the data popped off the stack as Pc, and the station represented by the data popped off the stack as Pc(s). Control then passes to step 120.

The process described above is repeated until the external connectivity of all of the ports on all of the stations in network 200 have been established. Any change in the physical connections between the networked devices will invalidate one or more entries in the database. Such changes may be detected by the network management station by periodically polling the various stations on the network, or by receiving trap messages indicative of a change from the changed stations. When this occurs, the connectivity of the network must then be reestablished, beginning again at step 100.

Figure 3:
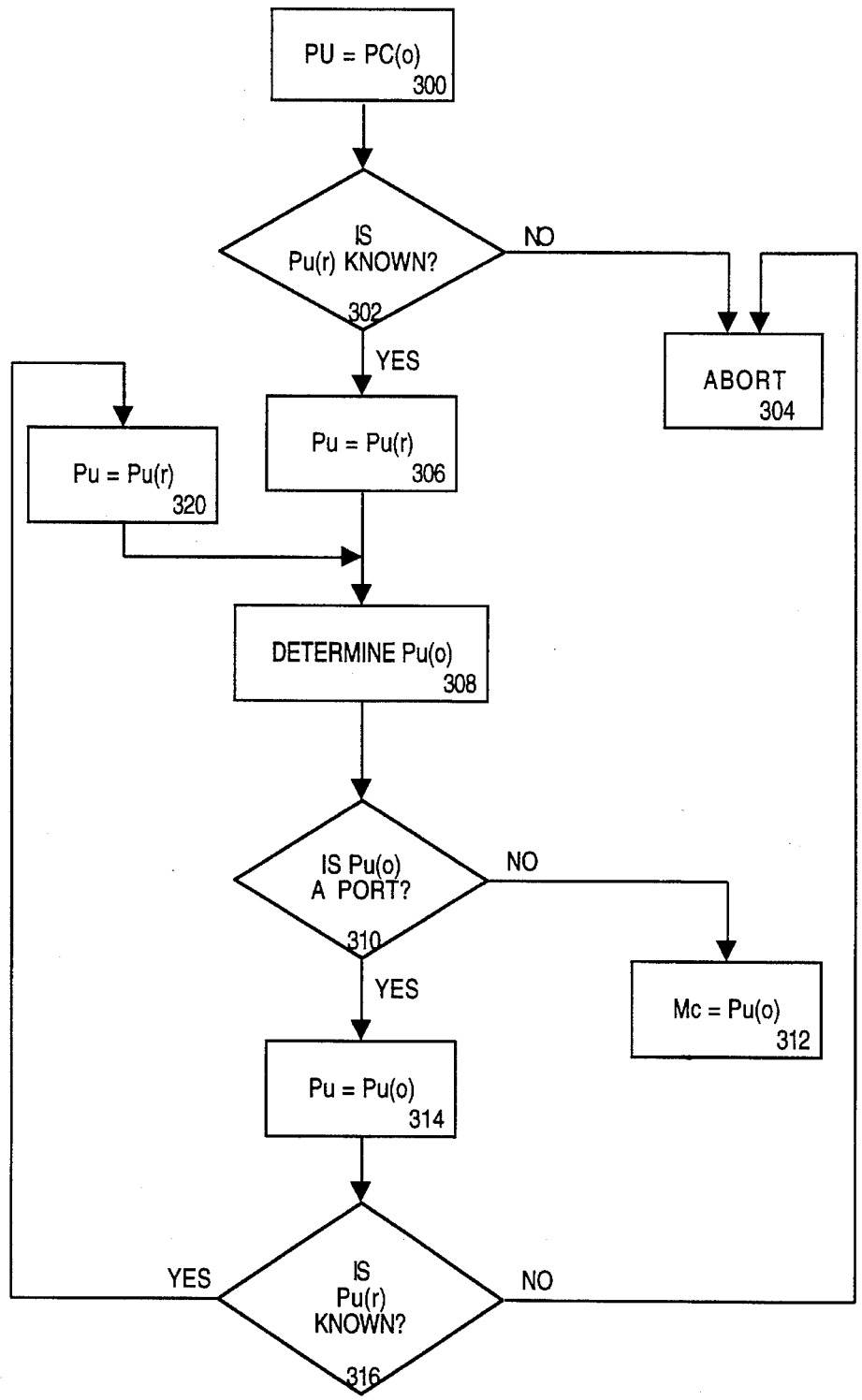
FIG. 3 is a flow chart showing steps for establishing a downstream MAC according to one, embodiment of the invention.

Referring now to FIG. 3, it illustrates a flow chart of the steps to establish a downstream MAC for a selected port. As described above, these steps constitute step 120 of FIG. 1b. For the purposes of explanation, it will be assumed that the presently selected port, Pc, is port 228, and that the external connectivity between ports 232 and 248, ports 250 and 260, and ports 262 and port 274 has been established.

At step 300, Pc(o), the port fed by the presently selected port, Pc, is established as Pu. In the present example, the port fed by port 228 is port 232. Therefore, port 232 is established as Pu. Control then passes to step 302.

At step 302, the network management station determines whether the remote connectivity of Pu is known. If the remote connectivity of Pu is known, control passes to step 306. Otherwise, the process aborts at step 304. In the present example, Pu is port 232, and it has been established that port 232 is externally connected to port 248. Therefore, control passes to step 306.

At step 306, Pu(r), the port externally connected to Pu, is established as Pu. Port 248 is Pu(r), the port externally connected to port 232. Therefore, port 248 is established as Pu. Control then passes to step 308.

At step 308, Pu(o), the entity which is fed by the output of port Pu, is determined. This determination is made using the data available for Pu(s), the station to which Pu belongs. Pu is port 248. Port 248 belongs to station 208. Therefore, the network management station inspects the data available for station 208 to determine that the entity fed by port 248 is port 250. Control then passes to step 310.

At step 310, the network management station determines whether Pu(o) is a port. If Pu(o) is a port, then control passes to step 314. If Pu(o) is not a port, control passes to step 312. In the present example, Pu(o) is port 250. Since port 250 is a port, control passes to step 314.

At step 314, Pu(o), which was determined to be a port, is established as Pu. In the present example, Pu(o) is port 250. Therefore, port 250 is established as Pu. Control then passes to step 316.

At step 316, the network management station determines whether Pu(r), the remote connectivity of Pu, is known. If Pu(r) is known, control passes to step 320, otherwise, the process aborts at step 304. In the present example, Pu is port 250 and it has been established that port 250 is externally connected to port 260. Therefore, control passes to step 320.

At step 320, Pu is set to Pu(r), the port to which the current Pu is externally connected. The current Pu is port 250 and Pu(r) is port 260. Pu is therefore set to Port 260. Control then passes back to step 308.

At step 308, Pu(o), the entity which is fed by the output of port Pu, is determined. This determination is made using the data available for Pu(s), the station to which Pu belongs. Pu is port 260. Port 260 belongs to station 212. Therefore, the network management station inspects the data available for station 212 to determine that the entity fed by port 260 is port 262. Control then passes to step 310.

At step 310, the network management station determines whether Pu(o) is a port. If Pu(o) is a port, then control passes to step 314. If Pu(o) is not a port, control passes to step 312. In the present example, Pu(o) is port 262. Since port 262 is a port, control passes to step 314.

At step 314, Pu(o), which was determined to be a port, is established as Pu. In the present example, Pu(o) is port 262. Therefore, port 262 is established as Pu. Control then passes to step 316.

At step 316, the network management station determines whether Pu(r), the remote connectivity of Pu, is known. If Pu(r) is known, control passes to step 320, otherwise, the process aborts at step 304. In the present example, Pu is port 262 and it has been established that port 262 is externally connected to port 274. Therefore, control passes to step 320.

At step 320, Pu is set to Pu(r), the port to which the current Pu is externally connected. The current Pu is port 262 and Pu(r) is port 274. Pu is therefore set to Port 274. Control then passes back to step 308.

At step 308, Pu(o), the entity which is fed by the output of port Pu, is determined. This determination is made using the data available for Pu(s), the station to which Pu belongs. Pu is port 274. Port 274 belongs to station 216. Therefore, the network management station inspects the data available for station 216 to determine that the entity fed by port 274 is MAC 276. Control then passes to step 310.

At step 310, the network management station determines whether Pu(o) is a port. If Pu(o) is a port, then control passes to step 314. If Pu(o) is not a port, control passes to step 312. In the present example, Pu(o) is MAC 276. Since MAC 276 is not a port, control passes to step 312.

At step 312, Pu(o), the entity fed by port Pu, is selected as Mc, the downstream MAC associated with Pc. Pu(o) is known to be a MAC since it has been determined in step 310 that Pu(o) is not a port. In the present example, Pu(o) is MAC 276. Therefore, MAC 276 is established as Mc.

Referring again to FIGS. 1a and 1b, in step 120, the downstream trace technique described above is used to establish MAC 276 as Mc associated with port 228. Once a downstream MAC has been established as Mc, control passes back to step 102.

At step 102, the network management station determines if Mc(una), the upstream neighbor MAC of Mc, is known. The upstream neighbor MAC of Mc is referred to as Mu. In the present example, the upstream neighbor MAC of MAC 276 is MAC 226. If the upstream neighbor MAC of Mc is not known, then the appropriate SIF information has not yet arrived. Therefore, control passes to step 104, where the mapping process aborts. However, if the upstream neighbor MAC of Mc is known, control passes to step 106.

At step 106, the network management station determines Mu(o), the port whose internal input is coupled to the output of Mu. In the present example, Mu is MAC 226, therefore Mu(o) is port 222. Once port 222 is determined to be the port whose internal input is coupled to the output of Mu, control passes to step 108.

At step 108, the network management station establishes Mu(o) as Pc(r), the port externally connected to Pc. TIffs step involves inserting an entry into the physical topology database to indicate a connection between Mu(o) and Pc. In the present example, the network management station will add an entry into the database to indicate that the port 228 is externally connected to port 222. Once the entry has been added to the database, control passes to step 110. The mapping process then proceeds as described above.

Figure 4:
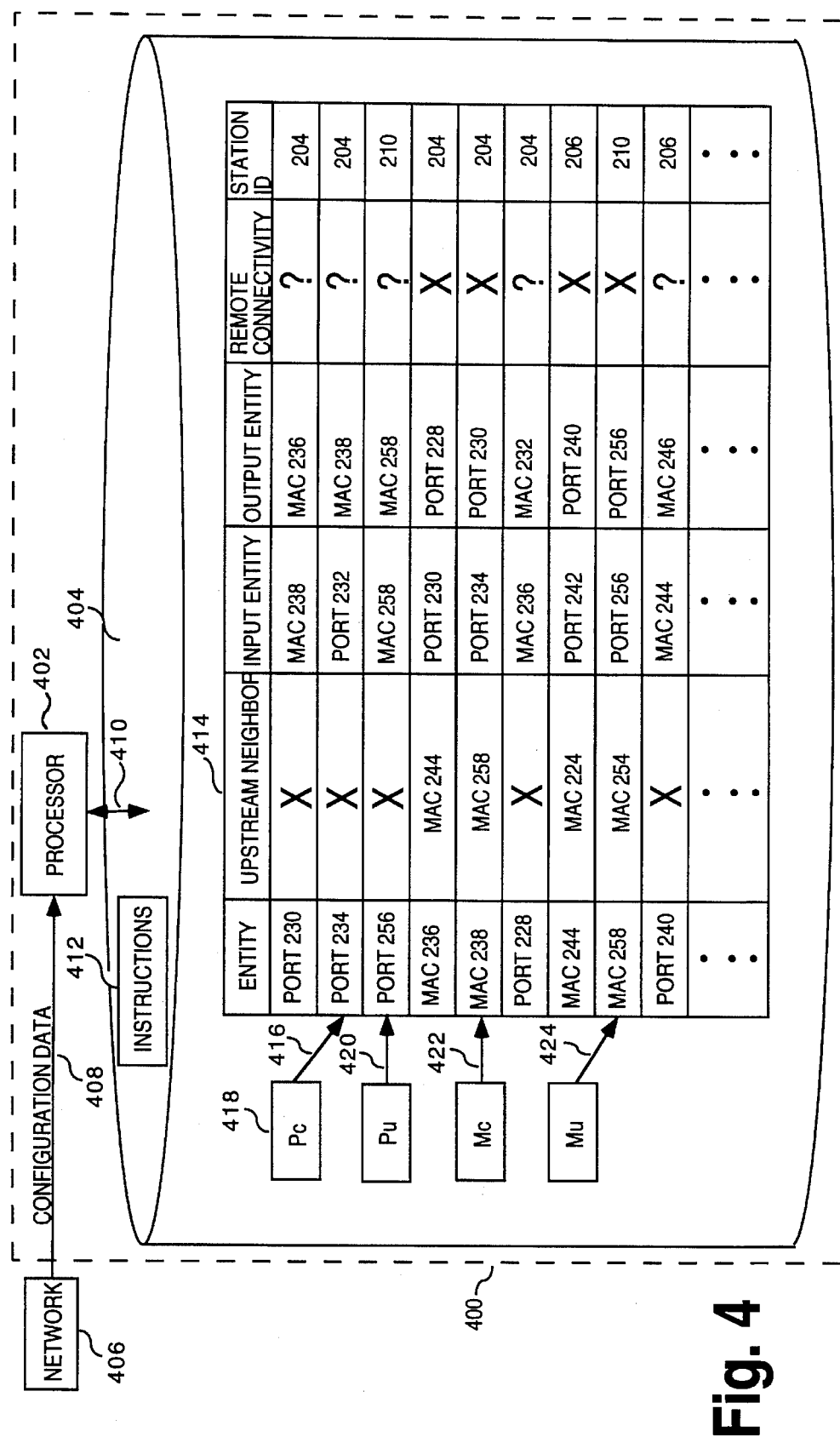
FIG. 4 is a block diagram of a network management station for constructing a topology map according to an embodiment of the invention.

Referring now to FIG. 4, it illustrates in block diagram form a network management station 400 according to one embodiment of the present invention. Network management station 400 generally includes a processor 402 and a storage device 404. Processor 402 is operatively coupled to an FDDI network 406 and receives configuration data from the various components of network 406 over a line 408. Processor 402 is also coupled to storage device 404 by a line 410.

Storage device 404 generally represents one or more mechanisms for storing dara. For example, storage device 404 may include read only memory, random access memory, and a magnetic disk storage medium. Processor 402 reads a plurality of instructions 412 from storage device 404 and executes the instructions to implement the topology mapping method described above. Specifically, in response to instructions 412, processor 402 constructs a topology table 414 on storage device 404.

Topology table 414 contains a column uniquely identifying each entity on network 406. For each entity that is a port, table 414 includes storage locations for the input entity of the port, the output entity of the port, the remote connectivity of the port, and a station ID indicative of the station in which the port resides. For each entity that is a MAC, table 4 14 includes a storage location for the upstream neighbor of the MAC, the input entity of the MAC, the output entity of the MAC, and data indicative of the station in which the MAC resides.

Pursuant to instructions 412, processor 402 fills in table 414 with the values supplied in the configuration data. As discussed above, the configuration data does not include remote connectivity of the ports in the network. Consequently, responsive to instructions 412, processor 402 executes the mapping process described above to determine the remote connectivity of each of the ports in the network.

While executing instructions 412 to perform the mapping process, processor 402 preferably employs a pointer 416 to keep track of which port is the currently selected port. Pointer 416 may be, for example, an address stored in a memory location 418 which corresponds to a storage location in table 414 containing data indicating the currently selected port. Similarly, processor 402 may employ a pointer 420 to keep track of the currently selected upstream port, a pointer 422 to keep track of the currently selected MAC, and a pointer 424 to keep track of the currently selected upstream MAC.

As is evident by the foregoing, a method and apparatus for mapping the physical connections between various entities on an FDDI network is provided. A network management station performs the mapping based on information received in SIF responses from the various entities on the network. The method generally includes the steps of selecting a port, determining a MAC downstream from the selected port, determining a MAC upstream from the downstream MAC, and determining output port of the upstream port. The network management station adds an entry to a connectivity table representing a connection between the output port of the upstream MAC and the selected port. This method does not require data acquisition hardware beyond those needed to implement the current FDDI standards.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A computer-implemented method for generating a physical topology map of a network, the method comprising the computer-implemented steps of:

a) selecting a first selected port on a station in said network as a currently selected port, said first selected port having an input entity and an output entity, said first selected port having an initially unknown external connectivity, wherein said output entity of said first selected port is known to be a first selected medium access controller;

b) selecting said first selected medium access controller as a currently selected medium access controller;

c) selecting a first upstream medium access controller as a currently selected upstream medium access controller, said first upstream medium access controller being an upstream neighbor medium access controller of said currently selected medium access controller, said currently selected upstream medium access controller having an input entity and an output entity, said currently selected upstream medium access controller being disposed within a station which includes one or more ports, each port of said one or more ports having an external connectivity;

d) selecting a first upstream port as a currently selected upstream port, said first upstream port being said output entity of said currently selected upstream medium access controller;

e) generating connection data which indicates that said currently selected upstream port is externally connected to said currently selected port;

f) determining whether said input entity of said currently selected port is a master port;

g) if said input entity of said currently selected port is not a master port, then determining whether said external connectivity of each port of said one or more ports is known;

h) if said input entity of said currently selected port is not a master port and if said external connectivity of each port of said one or more ports is not known, then performing the steps of:

h1) selecting said currently selected upstream medium access controller as said currently selected medium access controller;

h2) selecting said input entity of said currently selected upstream medium access controller as said currently selected port;

h3) selecting a second upstream medium access controller as said currently selected upstream medium access controller, said second upstream medium access controller being an upstream neighbor medium access controller of said currently selected medium access controller, said currently selected upstream medium access controller having an input entity and an output entity;

h4) selecting a second upstream port as said currently selected upstream port, said second upstream port being said output entity of said currently selected upstream medium access controller; and h5) generating connection data which indicates that said currently selected upstream port is externally connected to said currently selected port.

2. The method of claim 1 further including the steps of:

if said input entity of said currently selected port is a master port, then selecting said input entity of said currently selected port as said currently selected upstream port and determining whether said external connectivity of said currently selected upstream port is known;

if said input entity of said currently selected port is a master port and if said external connectivity of said currently selected upstream port is known, then determining whether said external connectivity of each port of said one or more ports is known.

3. The method of claim 2 further comprising the steps of:

if said input entity of said currently selected port is a master port, said external connectivity of said currently selected upstream port is known, and said external connectivity of each port of said one or more ports is known, then performing the steps of:

selecting said currently selected upstream port as said currently selected port;

selecting a first immediately downstream medium access controller as said currently selected medium access controller, said first immediately downstream medium access controller being a first medium access controller immediately downstream from said currently selected port;

selecting a second upstream medium access controller as said currently selected upstream medium access controller, said second upstream medium access controller being an upstream neighbor medium access controller of said currently selected medium access controller, said currently selected upstream medium access controller having an input entity and an output entity;

selecting a second upstream port as said current upstream port, said second upstream port being said output entity of said currently selected upstream medium access controller; and generating connection data which indicates that said currently selected upstream port is externally connected to said currently selected port.

4. The method of claim 2 further comprising the step of storing on a stack data identifying said input entity of said currently selected port if said input entity of said currently selected port is a master port, said external connectivity of said currently selected upstream port is known, and said external connectivity of each port of said one or more ports is not known.

5. The method of claim 4 further comprising the steps of, after storing on said stack data identifying said input entity of said currently selected port:

selecting said currently selected upstream medium access controller as said currently selected medium access controller;

selecting said input entity of said currently selected upstream medium access controller as said currently selected port;

selecting a second upstream medium access controller as said currently selected upstream medium access controller, said second upstream medium access controller being an upstream neighbor medium access controller of said currently selected medium access controller, said currently selected upstream medium access controller having an input entity and an output entity;

selecting a second upstream port as said current upstream port, said second upstream port being said output entity of said currently selected upstream medium access controller; and generating connection data which indicates that said currently selected upstream port is externally connected to said currently selected port.

6. The method of claim 3 wherein the step of selecting a first immediately downstream medium access controller as said currently selected medium access controller comprises the steps of:

selecting said output entity of said currently selected port as said currently selected upstream port;

selecting a port externally connected to said currently selected upstream port as said currently selected upstream port;

determining whether said output entity of said currently selected upstream port is a port or a medium access controller; and if said output entity of said currently selected upstream port is a medium access controller, then selecting said output entity of said currently selected upstream port as said currently selected medium access controller.

7. The method of claim 6 further comprising the steps of:

if said output entity of said currently selected upstream port is a port, then (i) selecting said output entity of said currently selected upstream port as said currently selected upstream port;
(ii) selecting a port remotely connected to said currently selected upstream port as said currently selected upstream port;
(iii) determining whether said output entity of said currently selected upstream port is a port or a medium access controller, and
(iv) if said output entity of said currently selected upstream port is a port, then repeating steps (i) to (iii) until said output entity of said currently selected upstream port is a medium access controller,
(v) if said output entity of said currently selected upstream port is a medium access controller, then selecting said output entity of said currently selected upstream port as said currently selected medium access controller.

8. The method of claim 1 wherein said step of e) generating connection data which indicates that said currently selected upstream port is externally connected to said currently selected port includes adding an entry into a physical topology database to indicate that said currently selected upstream port is externally connected to said currently selected port.

9. A network management station for generating a physical topology map of an FDDI network system, the network management station comprising:
  a processor;
  a storage device upon which is stored:
    a table for storing connection data indicative of a plurality of physical connections between a plurality of devices on said FDDI network system,
    identification data representing each device of said plurality of devices,
    a plurality of instructions,
    a currently selected port pointer for indicating a currently selected port,
    a currently selected upstream port pointer for indicating a currently selected upstream port,
    a currently selected medium access controller pointer for indicating a currently selected medium access controller, and
    a currently selected upstream medium access controller pointer for indicating a currently selected upstream medium access controller;
  said storage device king operatively coupled to said processor;
  said processor executing said plurality of instructions to generate said connection data, execution off said plurality of instructions causing said processor to perform the steps of:
    a) causing said currently selected port pointer to point to identification data representing a first selected port on a station in said network, said first selected port having an input entity and an output entity, said first selected port having an initially unknown external connectivity, wherein said output entity of said first selected port is known to be a first selected medium access controller;
    b) causing said currently selected medium access controller pointer to point to identification data representing said first selected medium access controller;
    c) causing said currently selected upstream medium access controller pointer to point to identification data representing a first upstream medium access controller, said first upstream medium access controller being an upstream neighbor medium access controller of said currently selected medium access controller, said currently selected upstream medium access controller having an input entity and an output entity;
    d) causing said currently selected upstream port pointer to point to identification data representing a first upstream port, said first upstream port being said output entity of said currently selected upstream medium access controller; and
    e) generating connection data which indicates that said currently selected upstream port is currently connected to said currently selected port;
  wherein said currently selected upstream medium access controller is disposed within a station which includes one or more ports, each port of said one or more ports having an external connectivity, execution of said plurality of instructions further causing said processor to perform the steps of:
    f) determining whether said input entity of said currently selected port is a master port;
    g) if said input entity of said currently selected port is not a master port, then determining whether said external connectivity of each port of said one or more ports is known;
    h) if said input entity of said currently selected port is not a master port and if said external connectivity of each port of said one or more ports is not known, performing the steps of:
      h1) causing said currently selected medium access controller pointer to point to be identification data representing said currently selected upstream medium access controller;
      h2) causing said currently selected port pointer to point to identification data representing said input entity of said currently selected upstream medium access controller;
      h3) causing said currently selected upstream medium access controller pointer to point to identification data representing a second upstream medium access controller, said second upstream medium access controller being an upstream neighbor medium access controller of said currently selected medium access controller, said currently selected upstream medium access controller having an input entity and an output entity;
      h4) causing said currently selected upstream port pointer to point to identification data representing a second upstream port, said second upstream port being said output entity of said currently selected upstream medium access controller; and
      h5) generating connection data which indicates that said currently selected upstream port is externally connected to currently selected port.

10. A network management station for generating a physical topology map of an FDDI network system, the network management station comprising:
  a processor;
  a storage device upon which is stored;
    a table for storing connection data indicative of a plurality of physical connections between a plurality of devices on said FDDI network system,
    identification data representing each device of said plurality of devices,
    a plurality of instructions,
    a currently selected port pointer for indicating a currently selected port, a currently selected upstream port pointer for indicating a currently selected upstream port, a currently selected medium access controller pointer for indicating a currently selected medium access controller, and a currently selected medium access controller pointer for indicating a currently selected upstream medium access controller;

said storage device being operatively coupled to said processor;

said processor executing said plurality of instructions to generate said connection data execution of said plurality of instructions causing said processor to perform the steps of:

a) causing said currently selected port pointer to point to identification data representing a first selected port on a station in said network, said first selected port having an input entity and an output entity, said first selected port having an initially unknown external connectivity, wherein said output entity of said first selected port is known to be a first selected medium access controller:

b) causing said currently selected medium access controller pointer to point to identification data representing said first selected medium access controller;

c) causing said currently selected upstream medium access controller pointer to point to identification data representing a first upstream medium access controller, said first upstream medium access controller being an upstream neighbor medium access controller of said currently selected medium access controller, said currently selected upstream medium access contoller having an input entity and an output entity;

d) causing said currently selected upstream port pointer to point to identification data representing a first upstream port, said first upstream port being said output entity of said currently selected upstream medium access controller; and e) generating connection data which indicates that said currently selected upstream port is externally connected to said currently selected port;

wherein said currently selected upstream medium access controller is disposed within a station which includes one or more ports, each port of said one or more ports having an external connectivity, execution of said plurality of instructions further causing said processor to perform the steps of:

f) determining whether said input entity of said currently selected port is a master port;

g) if said input entity of said currently selected port is a master port, then causing said currently selected upstream port pointer to point to identification data representing said input entity of said currently selected port and determining whether said external connectivity of said currently selected upstream port is known;

h) if said input entity of said currently selected port is a master port and if said external connectivity of said currently selected upstream port is known, then determining whether said external connectivity of each port of said one or more ports is known.

11. The network management station of claim 10 wherein execution of said plurality of instructions further causing said processor to perform the steps of:

if said input entity of said currently selected port is a master port, said external connectivity of said currently selected upstream port is known, and said external connectivity of each port of said one or more ports is known:

causing said currently selected port pointer to point to identification data representing said currently selected upstream port;

causing said currently selected medium access controller pointer to point to identification data representing a first immediately downstream medium access controller, said first immediately downstream medium access controller being a first medium access controller immediately downstream from said currently selected port;

causing said currently selected upstream medium access controller pointer to point to identification data representing a second upstream medium access controller, said second upstream medium access controller being an upstream neighbor medium access controller of said currently selected medium access controller, said currently selected upstream medium access controller having an input entity and an output entity;

causing said currently selected upstream port pointer to point to identification data representing a second upstream port, said second upstream port being said output entity of said currently selected upstream medium access controller; and generating connection data which indicates that said currently selected upstream port is externally connected to said currently selected port.

12. The network management station of claim 10 wherein execution of said plurality of instructions further causes said processor to perform the steps of storing on a stack data identifying said input entity of said currently selected port when said input entity of said currently selected port is a master port, said external connectivity of said currently selected upstream port is known, and said external connectivity of each port of said one or more ports is not known.

13. The network management station of claim 12 wherein execution of said plurality of instructions further causes said processor to perform the steps of, after storing on said stack data identifying said input entity of said currently selected port: p1 causing said currently selected medium access controller pointer to point to identification data representing said currently selected upstream medium access controller;

causing said currently selected port pointer to point to identification data representing said input entity of said currently selected upstream medium access controller;

causing said currently selected upstream medium access controller pointer to point to identification data representing a second upstream medium access controller, said second upstream medium access controller being an upstream neighbor medium access controller of said currently selected medium access controller, said currently selected upstream medium access controller having an input entity and an output entity;

causing said currently selected upstream port pointer to point to identification data representing a second upstream port, said second upstream port being said output entity of said currently selected upstream medium access controller; and generating connection data which indicates that said currently selected upstream port is externally connected to said currently selected port.

14. The network management station of claim 11 wherein the processor performs the step of causing said currently selected medium access controller pointer to point to identification data representing a first immediately downstream medium access controller by performing the steps of:

causing said currently selected upstream port pointer to point to identification data representing said output entity of said currently selected port;

causing said currently selected upstream port pointer to point to identification data representing a port externally connected to said currently selected upstream port;

determining whether said output entity of said currently selected upstream port is a port or a medium access controller; and if said output entity of said currently selected upstream port is a medium access controller, then causing said currently selected medium access controller pointer to point to identification data representing said output entity of said currently selected upstream pen.

15. The network management station of claim 14 wherein execution of said plurality of instructions further causes said processor to perform the steps of:

if said output entity of said currently selected upstream port is a port, then
(i) causing said currently selected upstream port pointer to point to identification data representing said output entity of said currently selected upstream port;
(ii) causing said currently selected upstream port pointer to point to identification data representing a port remotely connected to said currently selected upstream port;
(iii) determining whether said output entity of said currently selected upstream port is to a port or a medium access controller; and
(iv) if said output entity of said currently selected upstream pore is a port, then repeating steps (i) to (iii) until said output entity of said currently selected upstream port is a medium access controller;
(v) if said output entity of said currently selected upstream port is a medium access controller, then causing said currently selected medium access controller pointer to point to identification data representing said output entity of said currently selected upstream port.

16. The network management station of claim 9 wherein said identification data representing each device of said plurality of devices is storm in said table.

17. The network management station of claim 16 wherein said processor retrieves configuration data from said plurality of devices and stores said identification data in said table responsive to said configuration data.

* * * * *

UNITED STATES PATENT AND TRADEMARK OFFICE
CERTIFICATE OF CORRECTION

PATENT NO.   : 5,481,674
DATED        : January 2, 1996
INVENTOR(S)  : Mahavadi

It is certified that error appears in the above-identified patent and that said Letters Patent is hereby corrected as shown below:

On the title page, item

[54] change "METHOD AND APPARATUS MAPPING THE PHYSICAL TOPOLOGY OF EDDI NETWORKS"

to

--METHOD AND APPARATUS FOR MAPPING THE PHYSICAL TOPOLOGY OF FDDI NETWORKS--.

Signed and Sealed this

Sixteenth Day of April, 1996

BRUCE LEHMAN

*Attest:*

*Attesting Officer*   *Commissioner of Patents and Trademarks*